(12) United States Patent
Li et al.

(10) Patent No.: US 11,784,742 B2
(45) Date of Patent: Oct. 10, 2023

(54) OPTICAL MODULE, MANAGEMENT AND CONTROL INFORMATION PROCESSING METHOD, AND COMMUNICATION SYSTEM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Han Li, Beijing (CN); Dong Wang, Beijing (CN); Dechao Zhang, Beijing (CN); Yunbo Li, Beijing (CN); Liuyan Han, Beijing (CN); Qian Cai, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 0 days.

(21) Appl. No.: 17/610,721

(22) PCT Filed: Jun. 5, 2020

(86) PCT No.: PCT/CN2020/094681
§ 371 (c)(1),
(2) Date: Nov. 12, 2021

(87) PCT Pub. No.: WO2020/244634
PCT Pub. Date: Dec. 10, 2020

(65) Prior Publication Data
US 2022/0224434 A1    Jul. 14, 2022

(30) Foreign Application Priority Data
Jun. 6, 2019 (CN) .......................... 201910494149.2

(51) Int. Cl.
*H04J 14/02* (2006.01)
*H04B 10/40* (2013.01)
(Continued)

(52) U.S. Cl.
CPC .......... *H04J 14/0272* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| 5,107,490 A | * | 4/1992 | Wilson | H04J 3/0614 |
| | | | | 370/452 |
| 2010/0027545 A1 | * | 2/2010 | Gomes | H04L 69/22 |
| | | | | 370/392 |

(Continued)

FOREIGN PATENT DOCUMENTS

| CN | 1852071 A | 10/2006 |
| CN | 201766591 U | 3/2011 |

(Continued)

OTHER PUBLICATIONS

International Search Report in the international application No. PCT/CN2020/094681, dated Sep. 7, 2020, 2 pgs.

(Continued)

*Primary Examiner* — Darren E Wolf
(74) *Attorney, Agent, or Firm* — Cooper Legal Group, LLC (57) ABSTRACT

Provided are an optical module, a management and control information processing method, and a communication system. The optical module includes: a clock recovery unit, an optical transmitting unit, an optical receiving unit, and a micro-control unit. The optical module also includes: a logic (Continued)

processing unit, which is configured to add first management and control information to first service information, the first service information being service information sent by the optical module to an optical module on the other side, and obtain second management and control information from second service information, the second service information being service information sent by the optical module on the other side to the optical module.

17 Claims, 7 Drawing Sheets

(51) Int. Cl.
*H04B 10/50* (2013.01)
*H04B 10/60* (2013.01)

(56) References Cited

U.S. PATENT DOCUMENTS

| | | | | |
|---|---|---|---|---|
| 2011/0255858 | A1* | 10/2011 | Xie | H04J 14/06 398/1 |
| 2016/0134392 | A1 | 5/2016 | Effenberger et al. | |
| 2016/0182179 | A1 | 6/2016 | Poehlmann et al. | |

FOREIGN PATENT DOCUMENTS

| | | |
|---|---|---|
| CN | 103024718 A | 4/2013 |
| CN | 105450484 A | 3/2016 |
| CN | 105591798 A | 5/2016 |
| CN | 106817159 A | 6/2017 |
| CN | 107147513 A | 9/2017 |
| CN | 104980225 B | 10/2017 |
| CN | 105915292 B | 3/2019 |
| CN | 109617610 A | 4/2019 |
| EP | 3425826 A1 | 1/2019 |

OTHER PUBLICATIONS

English translation of the Written Opinion of the International Search Authority in the international application No. PCT/CN2020/094681, dated Sep. 7, 2020, 4 pgs.

* cited by examiner

OPTICAL MODULE, MANAGEMENT AND CONTROL INFORMATION PROCESSING METHOD, AND COMMUNICATION SYSTEM

CROSS-REFERENCE TO RELATED APPLICATION

The application claims priority to Chinese Patent Application No. 201910494149.2, filed on Jun. 6, 2019, the disclosure of which is hereby incorporated by reference in its entirety.

TECHNICAL FIELD

Embodiments of the disclosure relate to the technical field of communications, and in particular to an optical module, a management and control information processing method, and a communication system.

BACKGROUND

The Centralized, Cooperative & Cloud Radio Access Network (C-RAN) architecture of a real-time cloud infrastructure based on an open platform is an important evolution direction of the 5th Generation (5G) radio access network, including two scenarios: small concentration and large concentration. For a small concentration mode of the C-RAN, each Distributed Unit (DU) is connected to 5-10 physical stations, while for a large concentration mode, each DU is connected to 10-30 physical stations. Therefore, if a C-RAN-architecture-based fronthaul network adopts an optical fiber direct drive mode, a lot of optical fiber resources are needed. For example, one DU is connected to ten S111 physical stations, each Active Antenna Unit (AAU) is required to have two 25G ports in the case of 160 MHz spectrum, so if a dual-fiber bidirectional optical fiber direct drive mode is adopted, a total of 120 optical fibers are needed; if a single-fiber bidirectional optical fiber direct drive mode is adopted, 60 optical fibers are still needed, which poses a great challenge to optical fiber resources.

To solve the problem of optical fiber resource shortage, a Wavelength Division Multiplexing (WDM) technology is used to transmit a number of 25G color light wavelengths in the same optical fiber, and performs photoelectric conversion by means of an optical module, thereby effectively reducing the number of optical fibers required by the fronthaul network. Although a passive WDM device is used in the fronthaul network, which has the advantages of saving the optical fiber resources, no need to supply power, no transmission delay, and being transparent to service and transmission rate, etc., there are still problems of being lack of management measures, no awareness to an Optical Distribution Network (ODN) fault, and being difficult to operate and maintain the optical module. In case of a fault, multiple possible fault points, such as an optical module on a Remote Radio Unit (RRU) side, a multiplexer and demultiplexer on the RRU side, an optical fiber, a multiplexer and demultiplexer on the DU side, are eliminated manually, so the remote management and control for the optical module is difficult.

SUMMARY

The embodiments of the disclosure provide an optical module, a management and control information processing method, and a communication system to solve the problem that it is difficult to perform remote management and control for the optical module.

According to a first aspect of some embodiments of the disclosure, an optical module is provided, which may include a clock recovery unit, an optical transmitting unit, an optical receiving unit, and a micro-control unit. The optical module further includes a logic processing unit.

The clock recovery unit is connected to the optical receiving unit through the logic processing unit and the optical transmitting unit. The micro-control unit is connected to the logic processing unit.

The logic processing unit is configured to add first management and control information to first service information, the first service information being service information sent by the optical module to an optical module on the other side.

The logic processing unit is further configured to obtain second management and control information from second service information, the second service information being service information sent by the optical module on the other side to the optical module.

According to a second aspect of some embodiments of the disclosure, a method for sending management and control information is provided, which is applied to the optical module in the first aspect arranged at a sending end, and may include the following operation.

The logic processing unit adds the first management and control information to the first service information, the first service information being service information sent by the optical module to the optical module on the other side.

According to a third aspect of some embodiments of the disclosure, a method for receiving management and control information is provided, which is applied to the optical module in the first aspect arranged at a sending end, and may include the following operation.

The logic processing unit obtains the second management and control information from the second service information, the second service information being service information sent by the optical module on the other side to the optical module.

According to a fourth aspect of some embodiments of the disclosure, a communication system is provided, which may include: a first optical module and a second optical module. The first optical module is connected to the second optical module through the optical communication network. Both the first optical module and the second optical module are the optical modules in the first aspect.

In some embodiments of the disclosure, the logic processing unit is added in the optical module, through the interaction between the logical processing unit and the micro-control unit, functions of adding the management and control information to the service information and extracting the management and control information from the service information are realized, so that the optical module can send the management and control information to the optical module on the other side, and can obtain the management and control information from the optical module on the other side, thereby realizing the remote management and control for the optical module.

BRIEF DESCRIPTION OF THE DRAWINGS

In order to more clearly illustrate technical solutions in embodiments of the application, the drawings needed in the descriptions of the embodiments are simply introduced below. It is apparent that the accompanying drawings in the following description are only some embodiments of the application, for the ordinary skill in the art, some other accompanying drawings can also be obtained according to these on the premise of not contributing creative effort.

DETAILED DESCRIPTION

The technical solutions in the embodiments of the present application will be described clearly and completely below in combination with the drawings in the embodiments of the present application. It is apparent that the described embodiments are not all embodiments but part of embodiments of the application. All other embodiments obtained by those of ordinary skill in the art based on the embodiments in the disclosure without creative work shall fall within the scope of protection of the disclosure.

In addition, term "include" and any variations thereof in the specification and the claims of the application are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead. In addition, "and/or" used in the specification and the claims indicates at least one of the connected objects, for example, A and/or B indicates three cases, that is, individual A is included, individual B is included, and both A and B exist.

In the embodiments of the disclosure, the words like "exemplary" or "for example" are used to serve as example, example illustration or explanation. Any embodiments or designs described as "exemplary" or "for example" in the embodiments of the disclosure shall not be construed as being preferred or superior to other embodiments or designs. More exactly, the purpose of using the word "exemplary" or "for example" is to present related concepts in a specific way.

In the related art, there are two remote management and control manners for an optical module, that is, an out-of-band manner and an in-band manner. In the related out-of-band manner, a detection optical signal channel is arranged on a remote WDM device to transmit detection optical signal. In this way, faults of a trunk optical fiber and branches at the remote end can be detected. However, in this manner, additional channel resources have to be occupied, and a detection optical source and a detection receiving device have to be introduced, which increases system costs, and is difficult to meet the requirement for low cost of the fronthaul network.

In the related in-band manner, a modulation and demodulation unit of low-speed baseband signal is integrated in the optical module, and a monitoring signal is loaded onto the envelope of a carried service signal through amplitude modulation, so that the monitoring signal shares optical fiber and channel resources with the carried service signal. This manner saves the channel resources, and the transparent monitoring signal has nothing to do with the protocol of the carried service signal. However, low frequency amplitude modulation will reduce the transmission capability of the service signal, and the deeper the modulation is, the greater the influence is.

Therefore, a remote management and control scheme for the optical module that does not occupy the channel resources, has no need to introduce an additional detection light source, and does not affect the transmission capability of service information is urgently needed.

It is to be noted that the optical module provided by some embodiments of the disclosure may be applied to communication devices in the fronthaul network, for example, a Base Band Unit (BBU) and a RRU in the 4th Generation (4G) network, and a DU and an AAU in the 5G network. It is to be understood that the optical module provided by some embodiments of the disclosure may be applied to any type of communication device. The type of device to which the optical module is applied is not specified in some embodiments of the disclosure.

The optical module may be configured to send or receive service information. When the device in which the optical module is located works as a sending end, the device sends service information to an optical module on an opposite end device (also called a remote device) through the optical module. Correspondingly, when the device in which the optical module is located works as a receiving end, the device receives service information from the optical module on the other side device through the optical module.

Different optical modules may be connected through an optical communication network. For example, a WDM device or optical fiber is arranged outside the optical module to establish an optical connection between the optical module and the optical module on the other side. The WDM device is configured to combine two or more optical carrier signals with different wavelengths and couple them to the same optical fiber of an optical line for transmission, and separate optical carriers with various wavelengths from the converged optical carrier signal received. It is to be understood that the WDM devices are arranged on both a sending end device and a receiving end device. When the WDM device is applied to the sending end, it may also be called a multiplexer or a wave combiner. When the WDM device is applied to the receiving end, it may also be called a demultiplexer or a wave separator.

Figure 1:
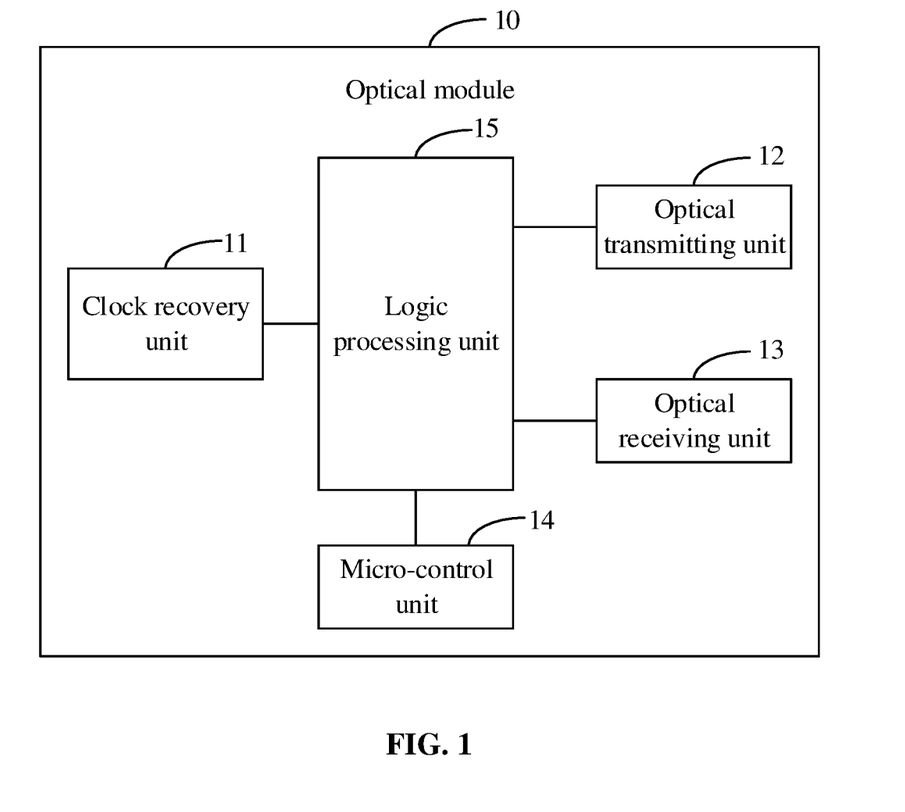
FIG. 1 is a first structure diagram of an optical module provided by some embodiments of the disclosure.

As shown in FIG. 1, some embodiments of the disclosure provide an optical module 10, which may include: a clock recovery unit 11, an optical transmitting unit 12, an optical receiving unit 13, and a micro-control unit 14. The optical module 10 may also include: a logic processing unit 15.

The clock recovery unit 11 is connected to the optical transmitting unit 12 and the optical receiving unit 13 through the logic processing unit 15. The micro-control unit 14 is connected to the logic processing unit 15.

The logic processing unit 15 is configured to add first management and control information to first service information, the first service information being service information sent by the optical module to an optical module on the other side. The optical module 10 is arranged at the sending end device. The first service information including the first management and control information is sent to the optical module on the other side through the optical module 10.

The logic processing unit 15 is further configured to obtain second management and control information from second service information, the second service information being service information sent by the optical module on the other side to the optical module. The optical module 10 is arranged at the receiving end device. The second service information including the second management and control information is received from the optical module on the other side through the optical module 10.

The first management and control information includes: first management information obtained by the micro-control unit 14 and/or second management information generated by the logic processing unit 15.

The second management and control information includes: third management information obtained by the micro-control unit 14 of the optical module on the other side and/or fourth management information generated by the logic processing unit of the optical module on the other side.

In some embodiments of the disclosure, the logic processing unit 15 is added in the optical module 10. The logic processing unit 15 has a capability of interactive communication with the micro-control unit 14.

In a scenario where the optical module 10 is arranged at the sending end, because the micro-control unit 14 can report and manage basic information of the optical module 10, the logic processing unit 15 may share the original management architecture and information of the optical module through the interactive communication with the micro-control unit, that is, the logic processing unit 15 may read the first management information from the micro-control unit 14. The first management information is the basic information obtained by the micro-control unit 14 monitoring the optical module 10. Correspondingly, the logic processing unit 15 adds the first management information to the first service information, so as to transfer the management information of the micro-control unit 14 to the optical module on the other side.

The logic processing unit 15 may also generate the management information by itself, that is, the second management information. The logic processing unit 15 adds the second management information to the first service information, so as to send the management information to the optical module on the other side along with the service information.

The logic processing unit 15 determines the first management and control information according to the first management information read from the micro-control unit 14 and/or the second management information generated by itself.

Optionally, the logic processing unit 15 is further configured to determine first Operation Administration and Maintenance (OAM) information according to the first management and control information. The logic processing unit 15 is further configured to add the first OAM information to the first service information.

By inserting the first management and control information into the first service information through an OAM byte, and sending the management and control information to the optical module on the other side along with the service information, the optical module on the other side can be managed, including querying, configuring, monitoring and other functions. It is to be understood that the first management and control information may be used for managing the optical module on the other side, managing a management system of the optical module on the other side, and managing a device in which the optical module on the other side is located.

In a scenario where the optical module 10 is arranged at the receiving end, the logic processing unit 15 extracts the second management and control information from the second service information. The second control information is added to the second service information by the logic processing unit of the optical module on the other side. The description of the second management and control information may refer to the description of the first management and control information, and elaborations are omitted herein.

Optionally, the logic processing unit 15 is further configured to obtain second OAM information from the second service information. The logic processing unit 15 is further configured to determine the second management and control information according to the second OAM information.

The logic processing unit 15 extracts the second management and control information from the second service information according to the OAM byte of the second service information, and sends the second management and control information to the micro-control unit 14. The micro-control unit 14 manages the optical module 10, the management system of the optical module 10 and/or the device in which the optical module 10 is located, including querying, configuring, monitoring and other functions.

Specifically, the micro-control unit 14 is further configured to manage the optical module according to the second management and control information when the second management and control information is used for managing the optical module.

The micro-control unit 14 is further configured to send the second management and control information to the management system of the optical module when the second management and control information is used for managing the management system of the optical module.

The micro-control unit 14 is further configured to send the second management and control information to the device in which the optical module is located when the second management and control information is used for managing the device in which the optical module is located.

After receiving the second management and control information, the micro-control unit 14 first determines which target the second management and control information is used for managing, and then performs corresponding management and control or forwards the management and control information according to a determination result.

It is to be understood that the logic processing unit 15 may be an independent chip based on the complexity of the management and control information to be processed. The logic processing unit 15 may also be a functional unit extended on the chip of the clock recovery unit 11. Some embodiments of the disclosure do not specify the implementation mode of the logic processing unit 15.

In some embodiments of the disclosure, the logic processing unit is added in the optical module, through the interaction between the logical processing unit and the micro-control unit, functions of adding the management and control information to the service information and extracting the management and control information from the service information are realized, so that the optical module can send the management and control information to the optical module on the other side, and can obtain the management and control information from the optical module on the other side, thereby realizing the remote management and control for the optical module.

Compared with the remote management and control scheme for the optical module in the related out-of-band manner, some embodiments of the disclosure adopt the in-band manner which adds the logic processing unit to the optical module, inserts a byte into the service information flexibly or fixedly, supports a simplified OAM function, and realizes the remote management and control scheme for the optical module. Because of the capability of interactive communication with the micro-control unit, a remote device can manage the optical module in a local device, including querying, configuring, monitoring and other functions, or manage the state of the local device, including querying, monitoring and other functions. In this way, the channel resources are not occupied, and there is no need to introduce the additional detection light source, and the system cost is saved.

Compared with the remote management and control scheme for the optical module in the related in-band manner, the logic processing unit is added in the optical module of some embodiments of the disclosure, the byte is inserted into the service information flexibly or fixedly, the simplified OAM function is supported, and the remote management and control scheme for the optical module is realized. Because of the capability of interactive communication with the micro-control unit, a remote device can manage the optical module in a local device, including querying, configuring, monitoring and other functions, or manage the state of the local device, including querying, monitoring and other functions, but not including the configuring function. In this way, the capability of transmitting the service information is not affected based on electrical layer processing.

Further, the clock recovery unit 11 is configured to receive the first service information from an electrical interface, and perform clock recovery to the first service information. The electrical interface is used for interaction between the optical module 10 and the device in which the optical module is located. The first service information is received through the electrical interface. The first service information is an electrical signal. The clock recovery unit 11 performs clock recovery to the first service information.

The optical transmitting unit 12 is configured to receive the first service information including the first management and control information from the logic processing unit 15, and send the first service information including the first management and control information to the optical module on the other side. The optical transmitting unit 12 converts the first service information including the first management and control information from an electrical signal into an optical signal, and sends it to the optical module on the other side through the optical communication network.

The optical receiving unit 13 is configured to receive the second service information including the second management and control information from the optical module on the other side, and send the second service information including the second management and control information to the logic processing unit 15. The optical receiving unit 13 receives the second service information including the second management and control information from the optical module on the other side through the optical communication network. The second service information is an optical signal. The optical receiving unit 13 converts the optical signal into the electrical signal, and sends it to the logic processing unit 15.

The clock recovery unit 11 is further configured to receive the second service information from the logic processing unit 15, and send the second service information to the electrical interface. The clock recovery unit 11 performs clock recovery to the second service information, and then sends the second service information to the device in which the optical module is located through the electrical interface, to realize service information communication.

Figure 2:
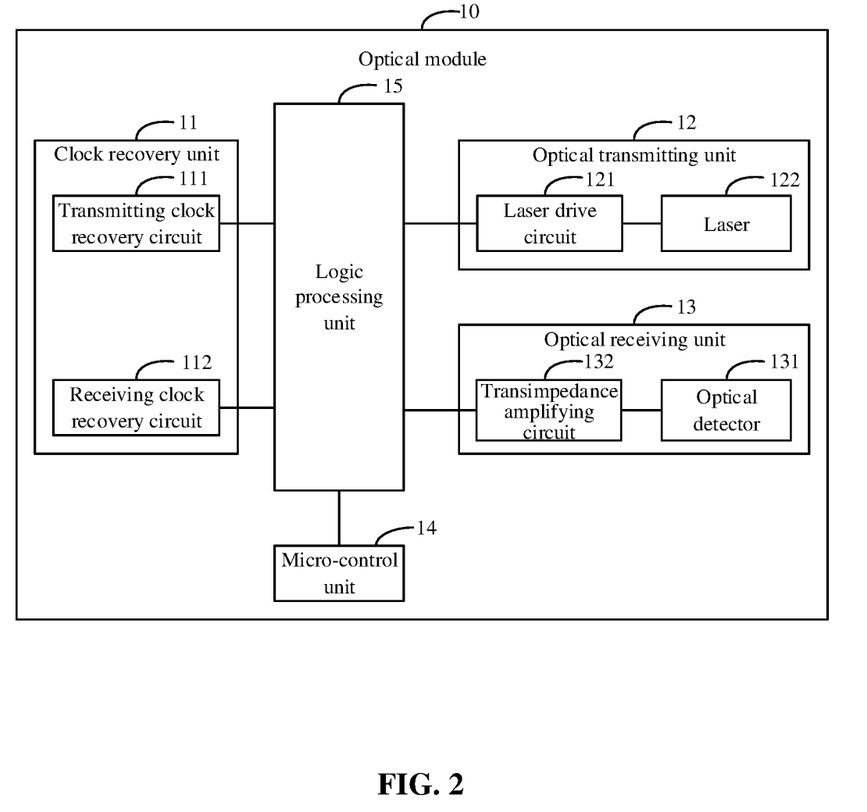
FIG. 2 is a second structure diagram of an optical module provided by some embodiments of the disclosure.

As shown in FIG. 2, in a specific embodiment of the disclosure, the structure of each unit of the optical module 10 is as follows. The description of the micro-control unit 14 and the logic processing unit 15 may refer to the related description in FIG. 1, and elaborations are omitted herein.

The clock recovery unit 11 may include: a transmitting clock recovery circuit 111.

The transmitting clock recovery circuit 111 is configured to receive the first service information from the electrical interface, and perform clock recovery to the first service information.

The optical transmitting unit 12 may include: a laser drive circuit 121 and a laser 122.

The laser drive circuit 121 is configured to perform power amplification on the first service information including the first management and control information, and modulate the laser 122.

The laser 122 is configured to send the first service information including the first management and control information to the optical module on the other side through the optical signal.

The optical receiving unit 13 may include: an optical detector 131 and a transimpedance amplifying circuit 132.

The optical detector 131 is configured to receive the second service information including the second management and control information from the optical module on the other side through the optical signal.

The transimpedance amplifying circuit 132 is configured to convert a current signal of the second service information including the second management and control information into a voltage signal.

The clock recovery unit 11 may also include: a receiving clock recovery circuit 112.

The receiving clock recovery circuit 112 is configured to perform clock recovery to the second service information and send the second service information to the electrical interface.

Specifically, in an information sending direction, the transmitting clock recovery circuit 111, the logic processing unit 15, the laser drive circuit 121 and the laser 122 are connected electrically successively; in an information receiving direction, the optical detector 131, the transimpedance amplifying circuit 132, the logic processing unit 15 and the receiving clock recovery circuit 112 are connected electrically successively. The laser 122 and the optical detector 131 in the optical module 10 are optically connected to the wave combiner and separator, the optical fiber, and the optical module on the other side outside the optical module 10.

In some embodiments of the disclosure, the logic processing unit is added in the optical module, through the interaction between the logical processing unit and the micro-control unit, functions of adding the management and control information to the service information and extracting the management and control information from the service information are realized, so that the optical module can send the management and control information to the optical module on the other side, and can obtain the management and control information from the optical module on the other side, thereby realizing the remote management and control for the optical module.

Figure 3:
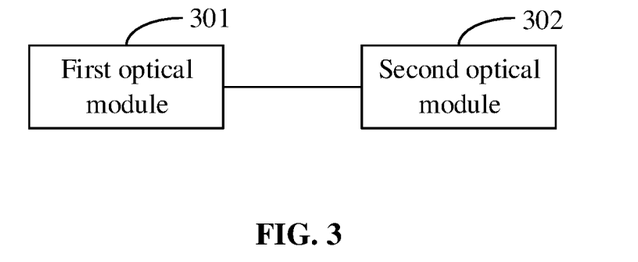
FIG. 3 is a structure diagram of a communication system provided by some embodiments of the disclosure.

As shown in FIG. 3, some embodiments of the disclosure also provide a communication system, which may include:

a first optical module 301 and a second optical module 302. The first optical module 301 is connected to the second optical module 302 through the optical communication network. Both the first optical module 301 and the second optical module 302 are the optical module 10 shown in FIG. 1 or FIG. 2.

It is to be understood that, in an actual process of managing and controlling the optical module, the first optical module 301 may send the management and control information to the second optical module 302, or the second optical module 302 may send the management and control information to the first optical module 301, or both the first optical module 301 and the second optical module 302 may send the management and control information to the opposite end.

Figure 4:
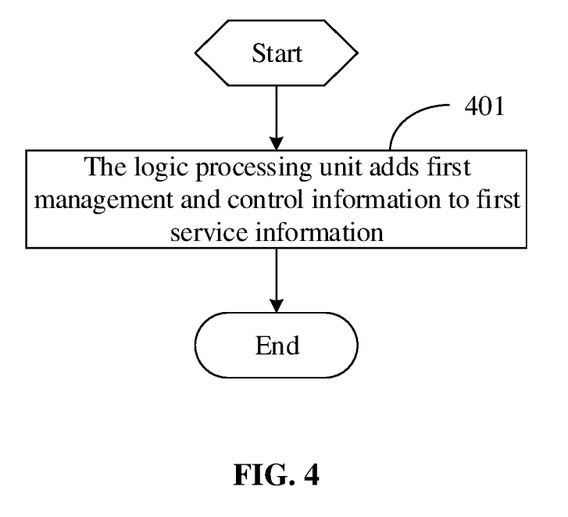
FIG. 4 is a first flowchart of a method for sending management and control information provided by some embodiments of the disclosure.

As shown in FIG. 4, some embodiments of the disclosure provide a method for sending management and control information. The method is performed by the optical module, which is arranged at the sending end. The method may include the following specific steps.

At S401, the logic processing unit adds the first management and control information to the first service information.

In some embodiments of the disclosure, the first service information is service information sent by the optical module to the optical module on the other side. The first management and control information includes: the first management information obtained by the micro-control unit and/or the second management information generated by the logic processing unit.

Specifically, the operation that the logic processing unit adds the first management and control information to the first service information may include the following sub-steps.
(1) The logic processing unit determines the first OAM information according to the first management and control information.
(2) The logic processing unit adds the first OAM information to the first service information.

The logic processing unit adds the first management and control information to the first service information by inserting the OAM byte into the first service information.

In some embodiments of the disclosure, the logic processing unit is added in the optical module, through the interaction between the logical processing unit and the micro-control unit, the management and control information can be added to the service information, so that the optical module can send the management and control information to the optical module on the other side, thereby realizing the remote management and control for the optical module.

Figure 5:
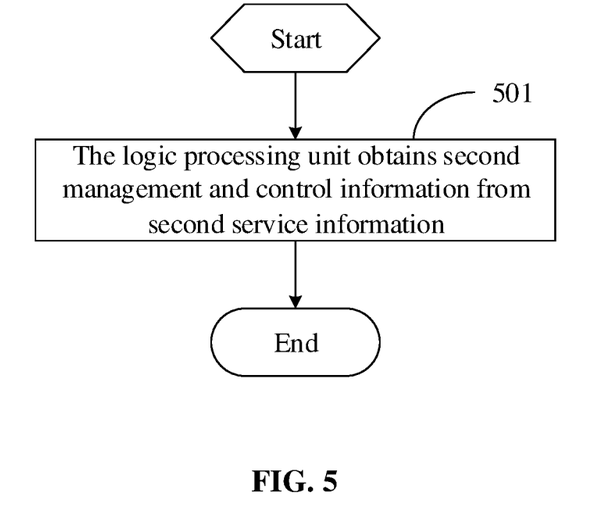
FIG. 5 is a first flowchart of a method for receiving management and control information provided by some embodiments of the disclosure.

As shown in FIG. 5, some embodiments of the disclosure provide a method for receiving management and control information. The method is performed by the optical module, which is arranged at the receiving end. The method may include the following specific steps.

At S501, the logic processing unit obtains the second management and control information from the second service information.

In some embodiments of the disclosure, the second service information is service information sent by the optical module on the other side to the optical module. The second management and control information includes: the third management information obtained by the micro-control unit of the optical module on the other side and/or the fourth management information generated by the logic processing unit of the optical module on the other side.

Specifically, the operation that the logic processing unit obtains the second management and control information from the second service information may include the following sub-steps.
(1) The logic processing unit obtains the second OAM information from the second service information.
(2) The logic processing unit determines the second management and control information according to the second OAM information.

The logic processing unit obtains the second management and control information from the second service information by extracting the OAM byte from the second service information.

Optionally, after obtaining the second management and control information from the second service information, the logic processing unit sends the second management and control information to the micro-control unit. The micro-control unit manages the optical module, the management system of the optical module and/or the device in which the optical module is located according to the second management and control information.

Specifically, the operation that the micro-control unit manages the optical module, the management system of the optical module and/or the device in which the optical module is located may include the following sub-steps.
(1) When the second management and control information is used for managing the optical module, the micro-control unit manages the optical module according to the second management and control information.
(2) When the second management and control information is used for managing the management system of the optical module, the micro-control unit sends the second management and control information to the management system of the optical module.
(3) When the second management and control information is used for managing the device in which the optical module is located, the micro-control unit sends the second management and control information to the device in which the optical module is located.

In some embodiments of the disclosure, the logic processing unit is added in the optical module, through the interaction between the logical processing unit and the micro-control unit, the function of extracting the management and control information from the service information is realized, so that the optical module can obtain the management and control information from the optical module on the other side, thereby realizing the remote management and control for the optical module.

Exemplarily, in a fronthaul scenario, the WDM device on the BBU/DU side transmits the management and control information to the optical module in the RRU (AAU) device, then the logic processing unit in the optical module extracts and judges the management and control information, interacts with the micro-control unit and transmits it to the RRU (AAU) device, or directly forwards it to the RRU (AAU) device, or manages and controls the optical module. The RRU (AAU) device transfers the management and control information to the optical module in the WDM device on the BBU/DU side, then the logic processing unit added in the optical module extracts and judges the management and control information, interacts with the micro-control unit and transmits it to the WDM device, or directly forwards it to the BBU/DU device, or manages and controls the optical module.

Figure 6:
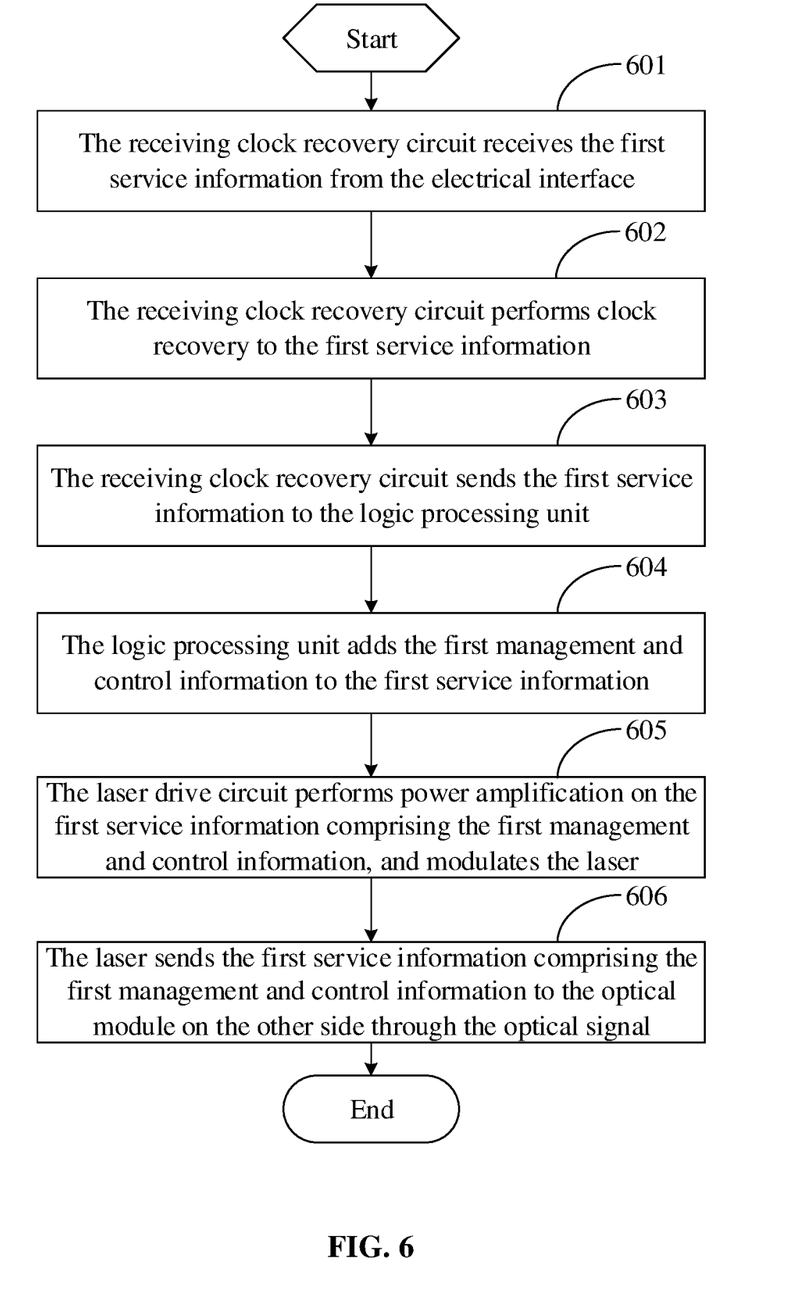
FIG. 6 is a second flowchart of a method for sending management and control information provided by some embodiments of the disclosure.

As shown in FIG. 6, some embodiments of the disclosure provide another method for sending management and control information. The method is performed by the optical module which is arranged at the sending end. The method may include the following specific steps.

At S601, the receiving clock recovery circuit receives the first service information from the electrical interface.

At S602, the receiving clock recovery circuit performs clock recovery to the first service information.

At S603, the receiving clock recovery circuit sends the first service information to the logic processing unit.

At S604, the logic processing unit adds the first management and control information to the first service information.

The description of S604 may refer to the description of S401 in FIG. 4, and elaborations are omitted herein.

At S605, the laser drive circuit performs power amplification on the first service information including the first management and control information, and modulates the laser.

At S606, the laser sends the first service information including the first management and control information to the optical module on the other side through the optical signal.

In some embodiments of the disclosure, the transmitting clock recovery circuit is configured to perform clock recovery to data information received by the electrical interface; the logic processing unit determines the management and control information according to the management information read from the micro-control unit and the management information generated by itself, and adds the management and control information by inserting the OAM byte into the data information; the laser drive circuit performs power amplification on the data information and modulates the laser, and converts the electrical signal into the optical signal; and the laser transmits the optical signal to the optical module on the other side through the wave combiner, the optical fiber, and the wave separator. In this way, the remote end can manage the optical module, including querying, configuring, monitoring and other functions.

Figure 7:
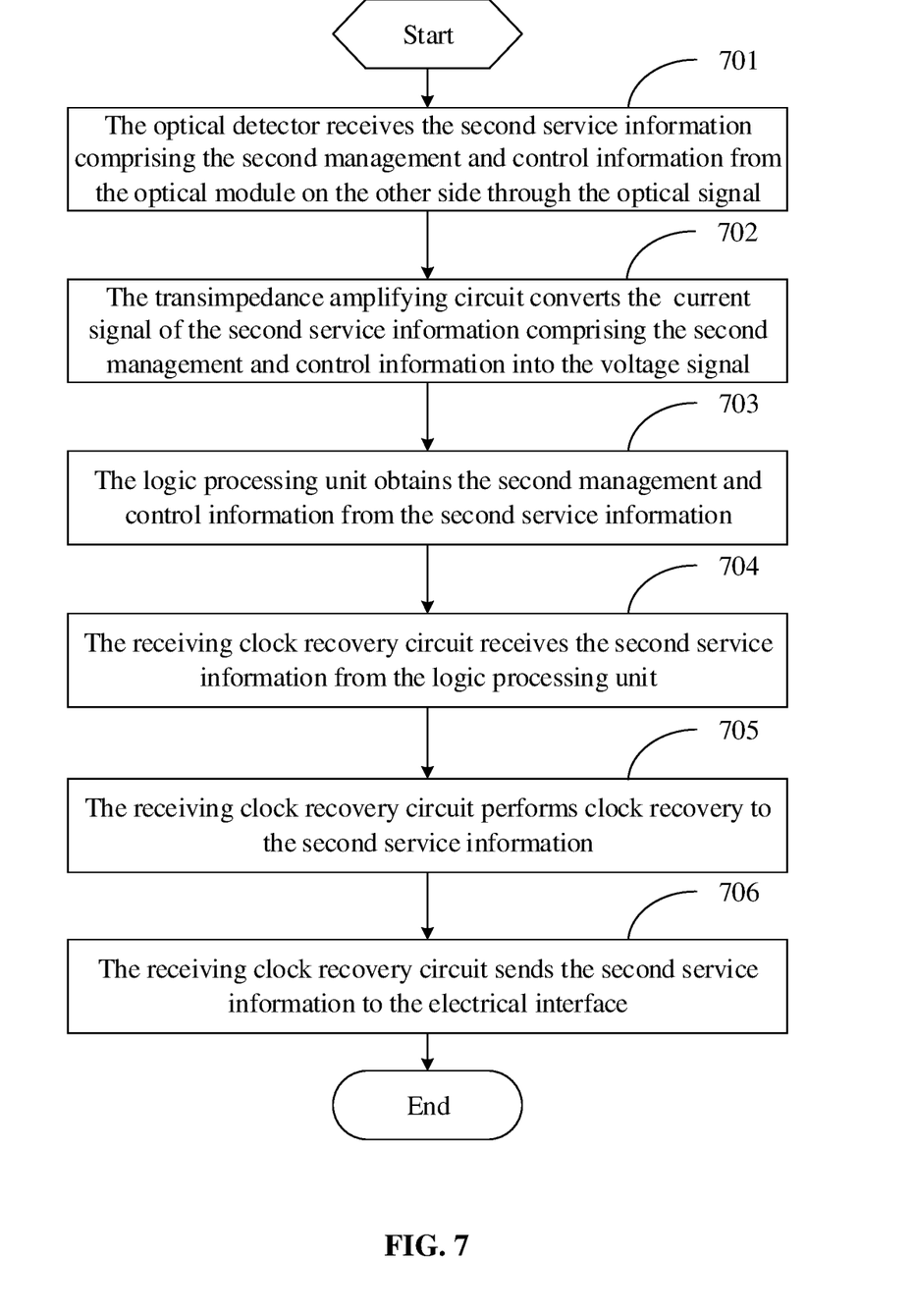
FIG. 7 is a second flowchart of a method for receiving management and control information provided by some embodiments of the disclosure.

As shown in FIG. 7, some embodiments of the disclosure provide another method for receiving management and control information. The method is performed by the optical module which is arranged at the receiving end. The method may include the following specific steps.

At S701, the optical detector receives the second service information including the second management and control information from the optical module on the other side through the optical signal.

At S702, the transimpedance amplifying circuit converts the current signal of the second service information including the second management and control information into the voltage signal.

At S703, the logic processing unit obtains the second management and control information from the second service information.

The description of S703 may refer to the description of S501 in FIG. 5, and elaborations are omitted herein.

At S704, the receiving clock recovery circuit receives the second service information from the logic processing unit.

At S705, the receiving clock recovery circuit performs clock recovery to the second service information.

At S706, the receiving clock recovery circuit sends the second service information to the electrical interface.

In some embodiments of the disclosure, the optical detector receives the optical signal, the transimpedance amplifying circuit converts the current signal after photoelectric conversion of the receiving end into the voltage signal, and the logic processing unit obtains the management and control information by extracting the OAM byte from the data information and sends the management and control information to the micro-control unit, so that the remote end can manage the optical module, including querying, configuring, monitoring and other functions. The receiving clock recovery circuit performs clock recovery to the data information and sends it to the electrical interface, thereby realizing service information communication.

In some embodiments of the disclosure, the logic processing unit is added in the optical module, through the interaction between the logical processing unit and the micro-control unit, functions of adding the management and control information to the service information and extracting the management and control information from the service information are realized, so that the optical module can send the management and control information to the optical module on the other side, and can obtain the management and control information from the optical module on the other side, thereby realizing the remote management and control for the optical module.

It is to be understood that these embodiments of the disclosure described here may be implemented by hardware, software, firmware, middleware, microcode, or a combination thereof. For hardware implementation, modules, units, sub-modules, subunits and so on may be realized in one or more of Application Specific Integrated Circuits (ASIC), Digital Signal Processors (DSP), DSP Devices (DSPD), Programmable Logic Devices (PLD), Field-Programmable Gate Arrays (FPGA), universal processors, controllers, micro-controllers, microprocessors, other electronic units for implementing the functions of the disclosure or a combination thereof.

For software implementation, the technology described in the embodiments of the disclosure can be implemented through modules (such as procedures and functions) that perform the functions described in the embodiments of the disclosure. A software code can be stored in the memory and executed by the processor. The memory can be implemented in or outside the processor.

Therefore, the objective of the disclosure may also be achieved by running a program or a group of programs in any computing apparatus. The computing apparatus may be a well-known universal apparatus. Therefore, the objective of the disclosure may also be achieved only by providing a program product including a program code that implements the method or the apparatus. That is, such a program product also forms the disclosure, and a storage medium storing the program product also forms the disclosure. Clearly, the storage medium may be any well-known storage medium or any storage medium to be developed in the future. It is also to be pointed out that each component or each step in the apparatus and method of the disclosure may clearly be split and/or recombined. Such splitting and/or recombination should be considered as equivalent solutions of the disclosure. Moreover, the series of processed steps may be naturally executed according to a time sequence of description, but are not always required to be executed according to the time sequence. Some steps may be executed concurrently or by itself.

The above is only the specific implementation manner of the present application and not intended to limit the scope of protection of the present application. Any variations or replacements within the technical scope disclosed by the application shall fall within the scope of protection of the present application. Therefore, the scope of protection of the present application shall be subject to the scope of protection of the claims.

The invention claimed is:

1. An optical module, comprising: a clock recovery circuit, a laser drive circuit, a laser, a transimpedance amplifying circuit, an optical detector, a micro-controller, and a logic processing chip;
   wherein the clock recovery circuit is connected to the laser drive circuit and the transimpedance amplifying circuit through the logic processing chip; the micro-controller is connected to the logic processing chip;
   wherein the logic processing chip is configured to add first management and control information to first service information, the first service information being service information sent by the optical module to a peer-end optical module; and
   wherein the logic processing chip is further configured to obtain second management and control information from second service information, the second service information being service information sent by the peer-end optical module to the optical module;
   wherein the first management and control information comprises at least one of first management information obtained by the micro-controller or second management information generated by the logic processing chip; and
   wherein the second management and control information comprises at least one of third management information obtained by a second micro-controller of the peer-end optical module or fourth management information generated by a second logic processing chip of the peer-end optical module.

2. The optical module of claim 1,
   wherein the logic processing chip is further configured to determine first Operation Administration and Maintenance (OAM) information according to the first management and control information; and
   wherein the logic processing chip is further configured to add the first OAM information to the first service information.

3. The optical module of claim 1,
   wherein the logic processing chip is further configured to obtain second Operation Administration and Maintenance (OAM) information from the second service information; and
   wherein the logic processing chip is further configured to determine the second management and control information according to the second OAM information.

4. The optical module of claim 3,
   wherein the logic processing chip is further configured to send the second management and control information to the micro-controller;
   wherein the micro-controller is further configured to manage at least one of the optical module, a management system of the optical module, or a device in which the optical module is located according to the second management and control information.

5. The optical module of claim 4, wherein
   the micro-controller is further configured to manage the optical module according to the second management and control information when the second management and control information is used for managing the optical module;
   the micro-controller is further configured to send the second management and control information to the management system of the optical module when the second management and control information is used for managing the management system of the optical module; and the micro-controller is further configured to send the second management and control information to the device in which the optical module is located when the second management and control information is used for managing the device in which the optical module is located.

6. The optical module of claim 1, wherein
   the clock recovery circuit is configured to receive the first service information from an electrical interface, and perform clock recovery to the first service information;
   the laser drive circuit and the laser are configured to receive the first service information comprising the first management and control information from the logic processing chip, and send the first service information comprising the first management and control information to the peer-end optical module;
   the transimpedance amplifying circuit and the optical detector are configured to receive the second service information comprising the second management and control information from the peer-end optical module, and send the second service information comprising the second management and control information to the logic processing chip; and
   the clock recovery circuit is further configured to receive the second service information from the logic processing chip, and send the second service information to the electrical interface.

7. The optical module of claim 6, wherein
   the clock recovery circuit comprises a transmitting clock recovery circuit;
   the transmitting clock recovery circuit is configured to receive the first service information from the electrical interface, and perform clock recovery to the first service information;
   the laser drive circuit is configured to perform power amplification to the first service information comprising the first management and control information, and modulate the laser;
   the laser is configured to send the first service information comprising the first management and control information to the peer-end optical module through an optical signal;
   the optical detector is configured to receive the second service information comprising the second management and control information from the peer-end optical module through the optical signal;
   the transimpedance amplifying circuit is configured to convert a current signal of the second service information comprising the second management and control information into a voltage signal;
   the clock recovery circuit further comprises a receiving clock recovery circuit;
   the receiving clock recovery circuit is configured to perform clock recovery to the second service information and send the second service information to the electrical interface.

8. A method for sending management and control information, applied to the optical module of claim 1, which is arranged at a sending end, comprising:
   adding, by the logic processing chip, the first management and control information to the first service information, the first service information being service information sent by the optical module to the peer-end optical module.

9. The method of claim 8, wherein adding, by the logic processing chip, the first management and control information to the first service information comprises:

determining, by the logic processing chip, first Operation Administration and Maintenance (OAM) information according to the first management and control information; and adding, by the logic processing chip, the first OAM information to the first service information.

10. The method of claim 8, wherein before adding, by the logic processing chip, the first management and control information to the first service information, the method further comprises:

receiving, by a receiving clock recovery circuit, the first service information from an electrical interface;

performing, by the receiving clock recovery circuit, clock recovery to the first service information; and sending, by the receiving clock recovery circuit, the first service information to the logic processing chip.

11. The method of claim 8, wherein after adding, by the logic processing chip, the first management and control information to the first service information, the method further comprises:

performing, by the laser drive circuit, power amplification on the first service information comprising the first management and control information, and modulating the laser; and sending, by the laser, the first service information comprising the first management and control information to the peer-end optical module through an optical signal.

12. A method for receiving management and control information, applied to the optical module of claim 1, which is arranged at a receiving end, the method comprising:

obtaining, by the logic processing chip, the second management and control information from the second service information, the second service information being service information sent by the peer-end optical module to the optical module.

13. The method of claim 12, wherein receiving, by the logic processing chip, the second management and control information from the second service information comprises:

obtaining, by the logic processing chip, second Operation Administration and Maintenance (OAM) information from the second service information; and determining, by the logic processing chip, the second management and control information according to the second OAM information.

14. The method of claim 13, wherein after determining, by the logic processing chip, the second management and control information according to the second OAM information, the method further comprises:

sending, by the logic processing chip, the second management and control information to the micro-controller; and managing, by the micro-controller, at least one of the optical module, a management system of the optical module, or a device in which the optical module is located, according to the second management and control information.

15. The method of claim 14, wherein managing, by the micro-controller of the optical module, at least one of the optical module, the management system of the optical module, or the device in which the optical module is located, according to the second management and control information comprises:

when the second management and control information is used for managing the optical module, managing, by the micro-controller, the optical module according to the second management and control information;

when the second management and control information is used for managing the management system of the optical module, sending, by the micro-controller, the second management and control information to the management system of the optical module; and when the second management and control information is used for managing the device in which the optical module is located, sending, by the micro-controller, the second management and control information to the device in which the optical module is located.

16. The method of claim 12, wherein before obtaining, by the logic processing chip, the second management and control information from the second service information, the method further comprises:

receiving, by an optical detector, the second service information comprising the second management and control information from the peer-end optical module through an optical signal; and converting, by the transimpedance amplifying circuit, a current signal of the second service information comprising the second management and control information into a voltage signal.

17. The method of claim 12, wherein after obtaining, by the logic processing chip, the second management and control information from the second service information, the method further comprises:

receiving, by a receiving clock recovery circuit, the second service information from the logic processing chip;

performing, by the receiving clock recovery circuit, clock recovery to the second service information; and sending, by the receiving clock recovery circuit, the second service information to an electrical interface.

* * * * *